United States Patent [19]

Salgado

[11] Patent Number: 5,605,055

[45] Date of Patent: Feb. 25, 1997

[54] ROOF MOUNTED AIR CONDITIONER

[75] Inventor: Mauricio M. Salgado, Escondido, Mexico

[73] Assignee: Carrier Corporation, Syracuse, N.Y.

[21] Appl. No.: 545,962

[22] Filed: Oct. 20, 1995

[51] Int. Cl.$^6$ .................................................. B60H 1/32
[52] U.S. Cl. ........................... 62/244; 62/DIG. 16
[58] Field of Search ........................... 62/244, DIG. 16, 62/239, 428, 429

[56] References Cited

U.S. PATENT DOCUMENTS

| | | | |
|---|---|---|---|
| 3,848,428 | 11/1974 | Reiter, Jr. | 62/285 |
| 3,984,224 | 10/1976 | Dawkins | 62/89 |
| 4,043,143 | 8/1977 | Finder et al. | 62/243 |
| 4,051,691 | 10/1977 | Dawkins | 62/236 |
| 4,134,275 | 1/1979 | Erickson et al. | 62/244 |
| 4,201,064 | 5/1980 | Krug et al. | 62/239 |
| 4,592,207 | 6/1986 | Rummel | 62/244 |
| 4,607,497 | 8/1986 | Ferdows et al. | 62/179 |
| 4,622,831 | 11/1986 | Grupa | 62/244 |
| 4,641,502 | 2/1987 | Aldrich et al. | 62/244 |
| 4,672,818 | 6/1987 | Roth | 62/244 |
| 4,727,728 | 3/1988 | Brown | 62/244 |
| 4,732,011 | 3/1988 | Haiya | 62/244 |
| 4,748,825 | 6/1988 | King | 62/244 |
| 4,787,210 | 11/1988 | Brown | 62/89 |
| 4,898,003 | 2/1990 | Ichikawa et al. | 62/244 |
| 4,905,478 | 3/1990 | Matsuda et al. | 62/244 |
| 4,926,655 | 5/1990 | King | 62/244 |
| 5,005,372 | 4/1991 | King | 62/244 |
| 5,184,474 | 2/1993 | Ferdows | 62/244 |
| 5,267,610 | 12/1993 | Culbert | 165/151 |
| 5,285,654 | 2/1994 | Ferdows | 62/309 |

*Primary Examiner*—William E. Tapolcai

[57] ABSTRACT

An air conditioner unit suitable for mounting on the roof of a bus. The unit has a unitary molded base and unitary molded cover. The base has a longitudinal centrally located opening therein which serves as the return air inlet. A pair of evaporator coils are mounted outboard from the opening. Outboard from each of the evaporator coils are evaporator fans. Outboard from the evaporator fans are condenser fans, and, outboard from the condenser fans are a pair of condenser coils. the air flow passages for both the evaporators and condensers are located between each of the pairs of condenser coils and evaporator fans.

6 Claims, 9 Drawing Sheets

ROOF MOUNTED AIR CONDITIONER

BACKGROUND OF THE INVENTION

The present invention relates in general to air conditioner units, and more specifically to an air conditioner unit suitable for mounting on the roof of a vehicle, such as a bus.

Many air conditioner units adapted for mounting on the roof of a vehicle spread the condenser and evaporator functions into two separate packages, requiring considerable roof space as well as creating air drag. Roof mounted air conditioner units which incorporate both the evaporator and condenser functions in a single package quite often limit heat exchanger coil surface area, particular condenser coil surface area, limiting the capacity of the unit.

U.S. Pat. No. 4,926,655 Air Conditioner Unit Suitable for Mounting on the Roof of a Vehicle discloses a single package arrangement wherein a pair of evaporator coils and an evaporator air delivery assemblies are located outboard from a pair of condenser coils.

It is an object of the present invention to provide an air conditioner unit which includes evaporator and condenser functions in a single package wherein pairs of condenser and evaporator coils are located with the condenser coils outboard of the evaporator coils.

It is a further object of the invention to locate both condenser and evaporator air flow passageways between each of the pairs of condenser and evaporator coils.

It is yet another object of the present invention to locate condenser air delivery means and evaporator air delivery means between each of the pairs of condenser and evaporator coils.

SUMMARY OF THE INVENTION

An air conditioning unit suitable for mounting on the roof of a vehicle which has a passenger compartment and air delivery ducts and is adapted for delivery of conditioned air from the air conditioner unit into the passenger compartment of the bus. The air conditioning unit includes a frame having a bottom, top, first and second ends, and first and second sides. The frame has a longitudinal axis extending between the first and second ends and is adapted to be attached to the roof of the vehicle with the longitudinal axis of the frame oriented front to back on the vehicle. A longitudinal opening is provided in the bottom of the frame extending parallel to the longitudinal axis and having first and second sides which are equally spaced from the first and second sides of the frame. First and second elongated evaporator coils are located outboard from the longitudinal opening. Outboard from each of the evaporator coils is an evaporator air delivery means. Outboard from the evaporator air delivery means are condenser air flow delivery means. Finally, outboard of the condenser air flow delivery means, adjacent to the first and second sides of the frame, are a pair of elongated condenser coils. The air flow passages for both the evaporator and condenser coils are located between each of the pairs of condenser coils and evaporator air delivery means.

BRIEF DESCRIPTION OF THE DRAWINGS

This invention may be better understood and its numerous objects and advantages will become apparent to those skilled in the art by reference to the accompanying drawings, in which.

DESCRIPTION OF THE PREFERRED EMBODIMENT

Figure 1:
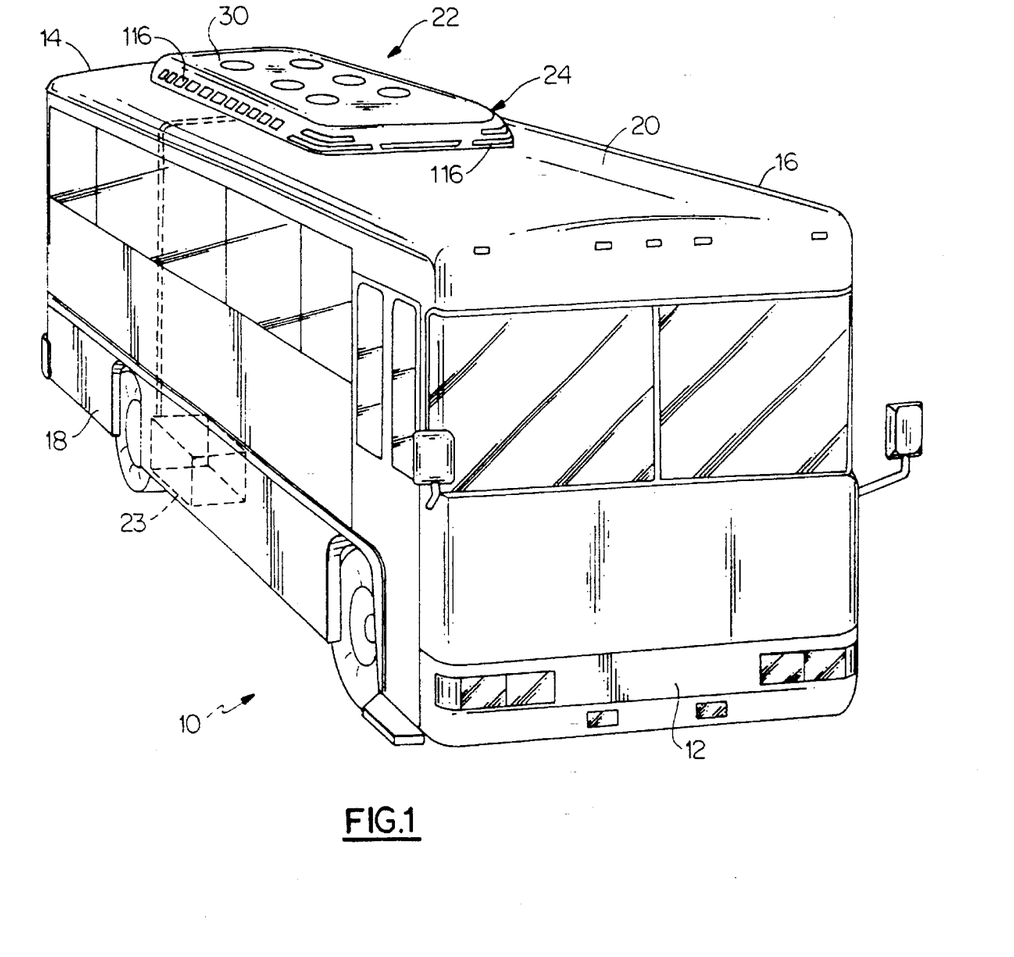
FIG. 1 is a perspective view of a bus having an air conditioner unit according to the present invention mounted on the roof thereof.

Referring now to the drawings, and to FIG. 1 in particular, there is shown a vehicle 10, such as a transit bus, having a front 12, back 14, and first and second sides, 16 and 18, respectively. The bus has a roof 20 and an interior passenger compartment 21 best shown in FIG. 8.

The bus 10 includes an air conditioning system 22, which is made up of a single air conditioner unit 24 and a power pack 23. The power pack 23, which is shown only diagramatically in FIG. 1 is of conventional design and is typically mounted within the bus 10, adjacent to one of the bus sides. As is well understood in the art, the power pack 23 includes a refrigerant compressor, and a prime mover such as an internal combustion engine.

The air conditioner unit 24 is mounted on the roof 20 of the bus by any suitable means (not shown). As will be described in detail below, the air conditioner unit contains the evaporator and condenser coils for the air conditioning system, the blowers or fans for causing circulation of air across these coils, the air passageways for such air flow, as well as other standard components of a vapor compression air conditioning system.

Figure 2:
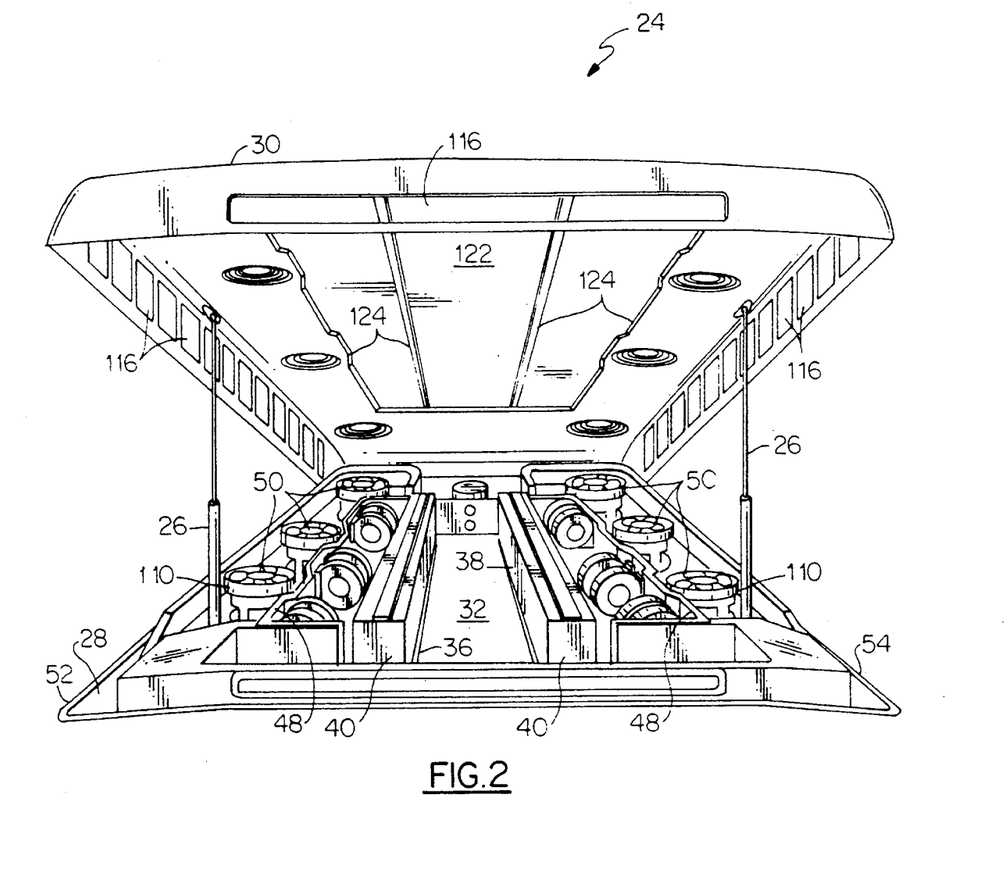
FIG. 2 is a perspective view of the air conditioner unit shown in FIG. 1 with the cover thereof opened to show the interior thereof.
Figure 3:
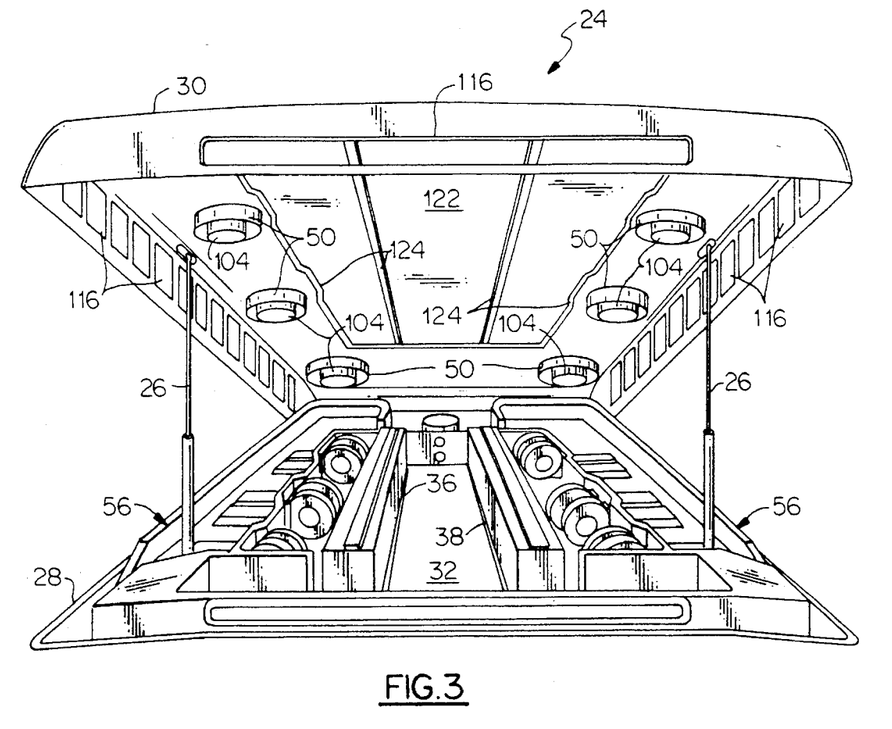
FIG. 3 is a view similar to that of FIG. 2 illustrating another embodiment of the invention.

Referring now to FIGS. 2 and 3, wherein two embodiments of the air conditioning unit 24 are shown, it will be noted that the unit comprises a base section 28 and a cover 30. The cover 30 is hinged at one end thereof by suitable hardware (not shown) and is likewise provided with suitable conventional latching hardware (not shown) at the other end thereof to facilitate holding the cover in its closed position as illustrated in FIG. 1 during normal operation of the system. Suitable devices, such as gas struts 26 are provided to hold the cover in the open position when desired.

As will be seen, the base 28 and the cover 30 are molded from a plastic resin, preferably a fiberglass reinforced thermosetting resin, in a single piece unit and are adapted to cooperate with one another when in the closed position to provide structural support of all components in the unit and to define the condenser air flow path and the evaporator air flow path of the unit. The location of the various major components will first be described and then the relationship of these components to the structural elements of the base 28 and the cover 30, and the air flow paths will be described in detail. As best show in FIGS. 2, 3 and 5, the base 28 is provided with a centrally located elongated opening 32. This opening 32 extends parallel to the longitudinal axis 34 of the base 28. As is seen in the various drawing figures, this axis extends between the front and back of the vehicle and is substantially parallel to the first and second sides 16 and 18 of the bus 10.

Located adjacent to each of the sides 36 and 38 of the elongated opening 32 is an elongated evaporator coil 40. Since the unit is symmetrical about the longitudinal axis 34, the same reference numerals will be applied to the various components of the system on each side of the axis. Located outboard from the evaporator coils 40 are three evaporator air delivery means 42. Each of the evaporator air delivery means 42 comprises a blower assembly having two blowers 44 driven by an intermediately disposed electric motor 46. Each of the evaporator air delivery means 42 is attached to a partition 48 which forms an integral part of the base 28. Both the partition and the attachment of the evaporator air delivery assemblies 42 thereto will be described in more detail below.

Located outboard from the partitions 48 are the condenser air delivery fans 50. The condenser air delivery fans 50 comprise two groups of three axial flow fans arranged to effect a vertical air flow relative to the unit 24. Two embodiments are illustrated for supporting the condenser air delivery fans 50 in their desired location. With reference to FIG. 2, it will be noted that the condenser air delivery fans 50 are mounted in a spaced relationship within the base 28. With reference to FIG. 3, the condenser air delivery fans 50 are mounted directly to the cover 30. Regardless of the method of mounting, the fans are in the same location when the cover 30 is closed and the unit is in operation. Each of these arrangements will be described in more detail below.

Finally, located outboard from the condenser air delivery fans 50 and adjacent to the sides 52 and 54 the base 28, are the condenser heat exchange coils 56. It should be noted that the condenser coils 56 extend longitudinally from one end 58 of the base in an inclined orientation to the other end 60 of the base wherein they undergo a double bend to transition to a substantially vertical orientation and a further bend 64 to define a U-shaped end thereto. The U-shaped end which provides three surfaces of the condenser surrounding a region 66 in which one of the condenser air delivery fans 50 is located.

Looking now primarily at FIGS. 6, 7 and 8 and with secondary reference to FIGS. 2, 3, 4 and 5, the air flow paths through the air conditioner unit 24 will be described. FIG. 8 illustrates a cross sectional area of the unit 28 mounted on the roof 20 of a bus 10. It should be appreciated that this showing is simplified and is meant only to facilitate the description of the air flow paths. First, the return flow from the passenger compartment 68, as illustrated by arrows 70, is through a longitudinal opening 72 in the roof of the bus which is configured to communicate with the elongated opening 32 in the base 28 of the air conditioner unit. A grill or louvers 74 or the like typically will be provided in the opening 72.

Air flowing from the interior of the bus is caused to flow by action of the evaporator air delivery fans 42 through the openings 72 and 32 and into an elongated plenum 76, which is defined on its upper side by the cover 30 and on its left and right sides by the faces 80 of the evaporator coils 40. Return air drawn in to the plenum 76 is caused to pass through the two evaporator coils 40 wherein it is cooled and dehumidified. Upon passing from the opposite faces 82 of the evaporator coils, the cooled and dehumidified air passes to another plenum 86, which is defined by the upstanding partitions 48, the cover 30 and the bottom 88 of the base 28.

Figures 12, 13, 14, 15, 16:
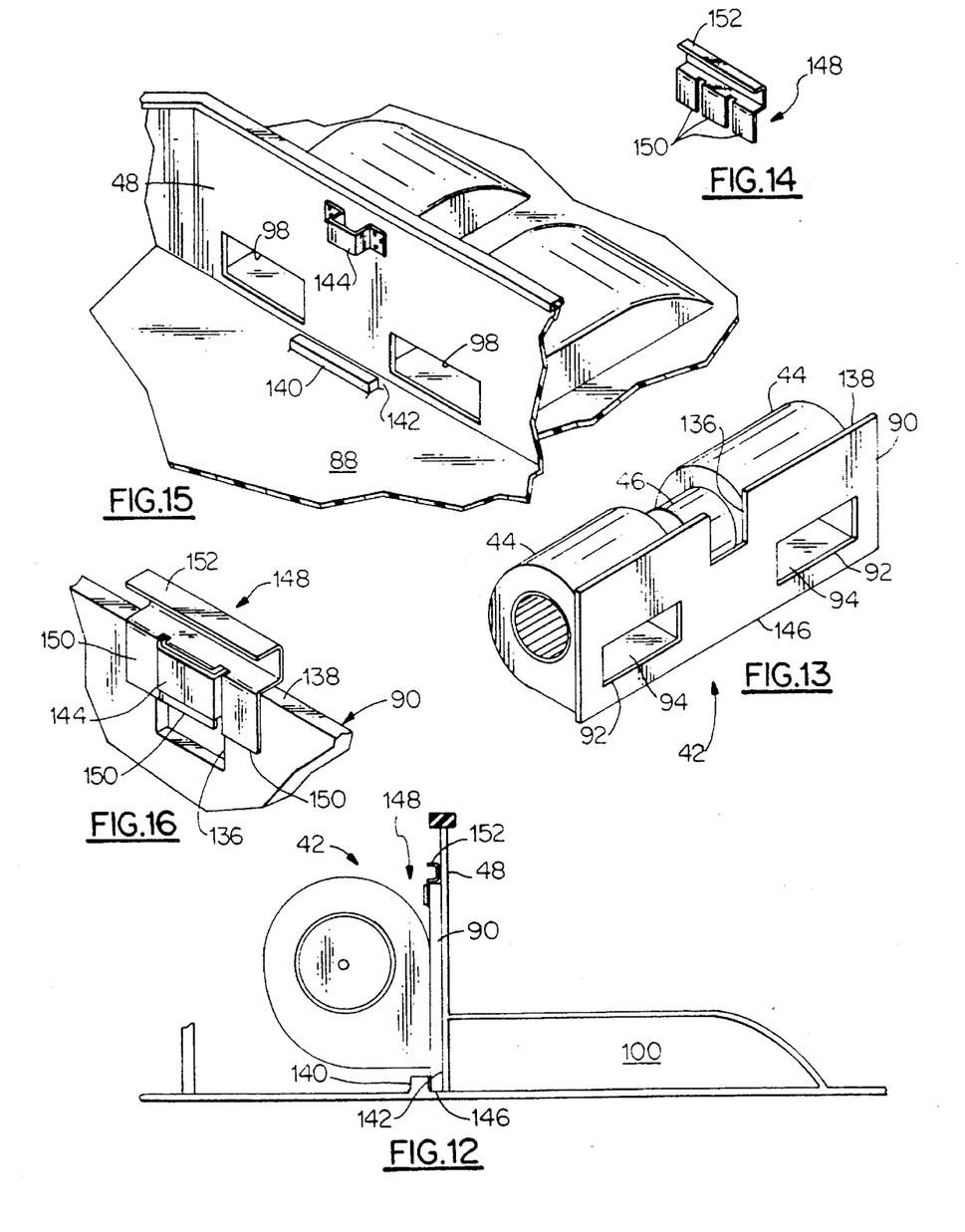
FIG. 12 is a cross sectional view of the mounting of an evaporator fan assembly taken along the line 12—12 of FIG. 5.
FIG. 13 is a perspective view of an evaporator air delivery assembly.
FIG. 14 is a perspective view of the evaporator air assembly attachment clip.
FIG. 15 is a broken away perspective view of the partition upon which the evaporator air delivery fans are mounted.
FIG. 16 is an enlarged view showing engagement of the clip of FIG. 14 with an evaporator fan assembly and the mating hardware.

Looking now at FIG. 13, it will be noted that each of the evaporator air delivery assemblies includes a fan mounting plate 90 having a pair of openings therein 92 which cooperate with the discharge openings 94 of each of the individual fans 44. As will be described in more detail hereinbelow, each of the outlets 92 is designed to cooperate with mating openings 98 provided in the partitions 48.

Each of the openings 98 communicates with a supply air passageway 100 each which is defined by a partition wall section 114 formed integrally into the molded base 28. As is evident from several of the drawing views, each of these passageways 100 extends from the mounting of the evaporator air delivery assembly 42 outwardly towards the outer edges of the unit wherein openings 101 are provided in the bottom 88 of the base 28 which cooperate with openings 103 in the roof 20 of the bus to thereby deliver cooled, dehumidified air to the passenger compartment 21.

Looking now to the condenser air flow path. First, the alternative mounting arrangements for the condenser air delivery fans 50 will be described. As mention hereinabove, the condenser air delivery fans are conventional axial flow fans of the type mounted within a shroud assembly 103 and each is driven by an individual motor 104. In the embodiment illustrated in FIGS. 3, 7 and 8, each of the condenser fan assemblies 50 is mounted directly in to an opening 106 provided in the cover 30. A conventional grill or the like 108 is provided to cover the upper surface thereof for aesthetic and safety purposes. Electrical supply wires for each of the motors 104 are not shown in the drawing figures but are adapted to pass from a suitable electrical supply and routed appropriately along the inside of the unit cover 30.

Figure 5:
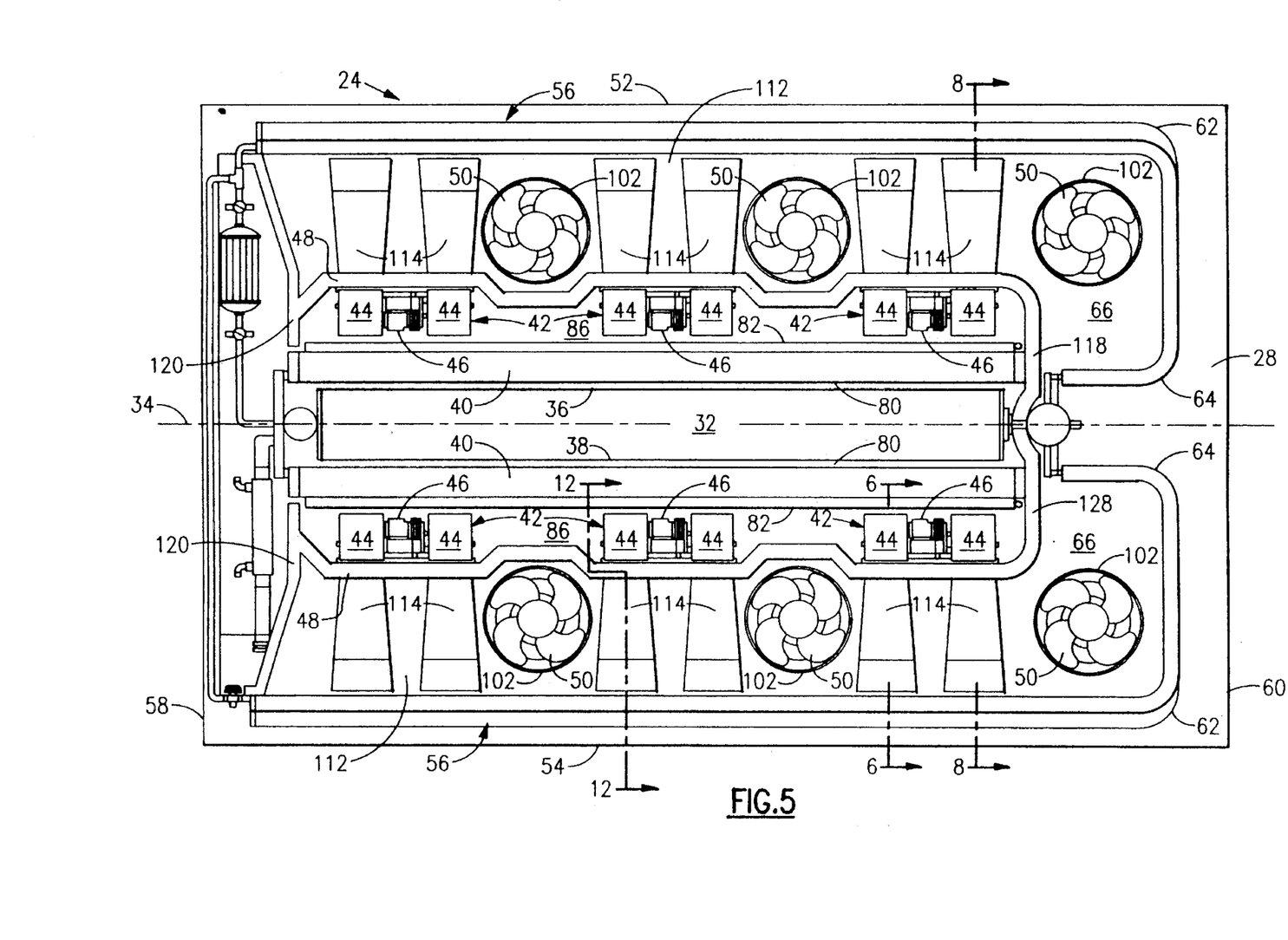
FIG. 5 is a plan view of the air conditioner unit of FIG. 1 with the upper cover removed.
Figure 6:
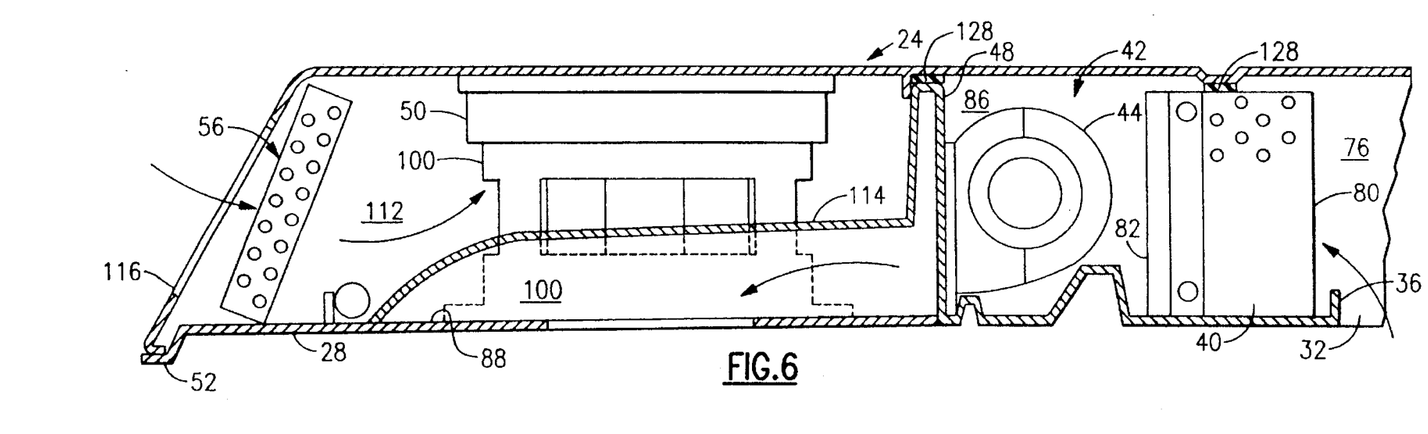
FIG. 6 is an enlarged cross sectional view taken along the line 6—6 of FIG. 5.

Another embodiment of the mounting of the condenser air delivery fans 50 is shown in FIGS. 2, 5 and 6, wherein the condenser fans, substantially as described above in connection with the previous embodiment, are supported by pedestal like supports 110, which may be molded directly into the base 28. With such an arrangement, the grill assemblies 108 are attached to the cover 30 to cover the openings 106 therein and are designed to mate with the six condenser air delivery fans 50 when the cover is moved to its closed position.

Figure 7:
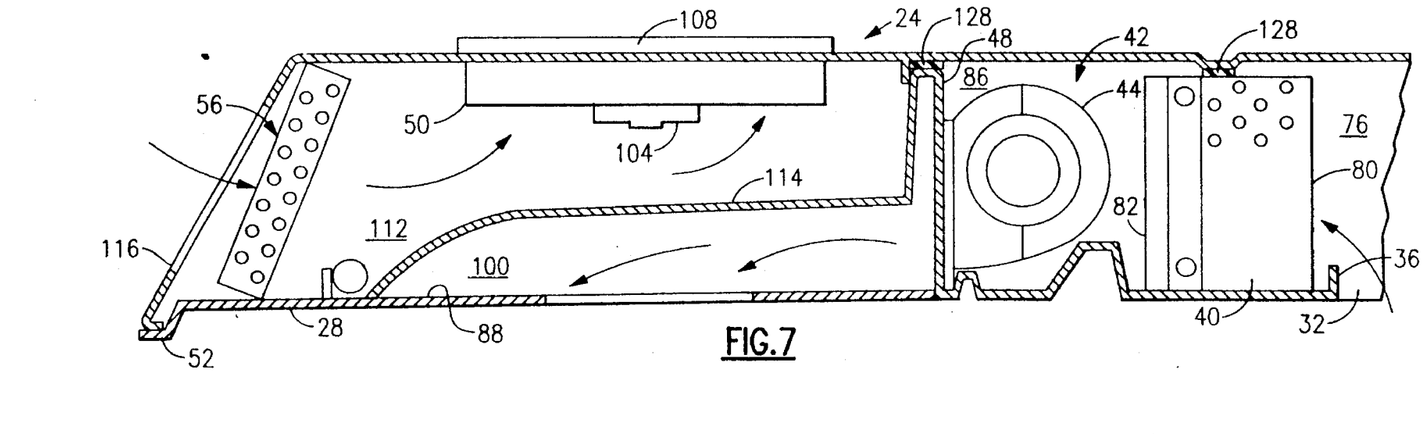
FIG. 7 is a view similar to FIG. 6 illustrating another embodiment of the invention.
Figure 8:
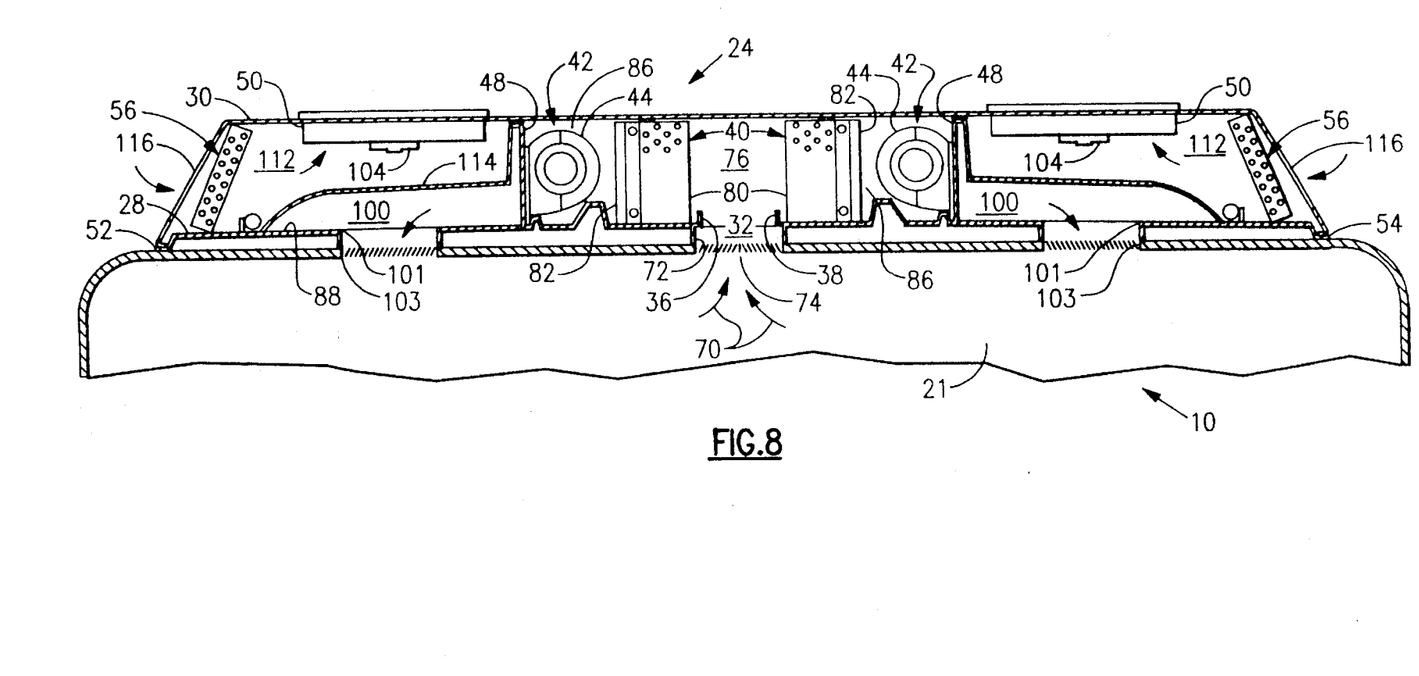
FIG. 8 is a cross sectional view of the unit as taken along the line 8—8 of FIG. 5 illustrating the unit mounted on a bus roof top.

Regardless of the arrangement of supporting the condenser air delivery fans, the air flow path for condenser air is the same and is shown in FIGS. 6, 7 and 8.

As mentioned above, the preferred direction of air flow of the condenser air delivery fans 50 is vertically upwardly as viewed in the drawing figures. As a result, the entire area outside of the partitions 28, the bottom 88 of the base 28 and the upper portion of the cover 30 defines the condenser air flow plenum 112. It should be appreciated with reference to the drawing figures that this region includes the area overlying the partitions 114 which define the supply air passageways 100.

As a result of the above described arrangement, when the condenser fans are operating a region of low pressure is established within the plenum 112 and air flow is caused to move into that region through the various openings 116 provided in the outer periphery of the cover 30. As illustrated in FIGS. 6 and 7, this air flow is directly across the condenser coils 56. It should be appreciated that the condenser fans 50 located within the regions 66 defined by the U-shaped bends in the condenser coils 56 causes air flow to be drawn across three linear sections portion of the condenser coil thereby resulting in an extremely high value of heat transfer occurring in these regions of the unit.

Figure 4:
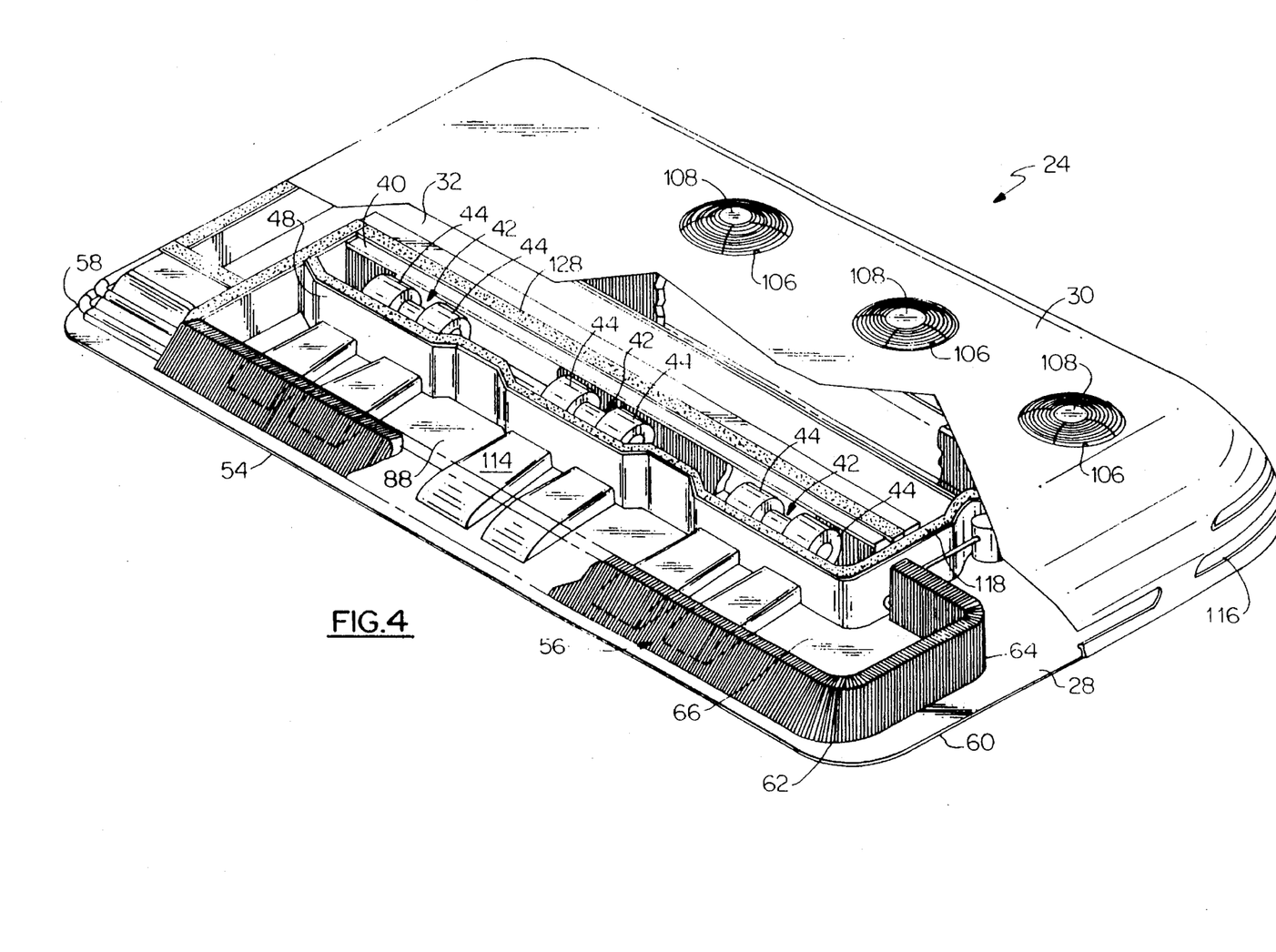
FIG. 4 is a perspective view of the air conditioner unit shown in FIG. 1 with the upper cover and some of the components partially broken away and/or removed in order to facilitate illustration of other features.

As best shown in FIGS. 4 and 5, the partitions 48 are interconnected at the right-hand end, as viewed in these drawing figures, by an end partition 118. At the left-hand end, the partitions 48 intersect with additional partition sections 120 which serve to additionally define the evaporator fan plenums 86 and the condenser fan plenums 112.

It will be appreciated with reference to FIGS. 2 and 3 that there is integrally formed with the inner surface 122 of the cover 30 a series of upstanding surfaces, generally 124, which are adapted to mate with the upper ends of the various partition sections 48, 118 and 120 to effectively seal these regions to enhance the efficiency of air flow therethrough. Also, as shown generally by reference numeral 128, gasket or sealing material may be provided on the upper edges of the various partitions in order to further enhance the desired seal.

Figure 9:
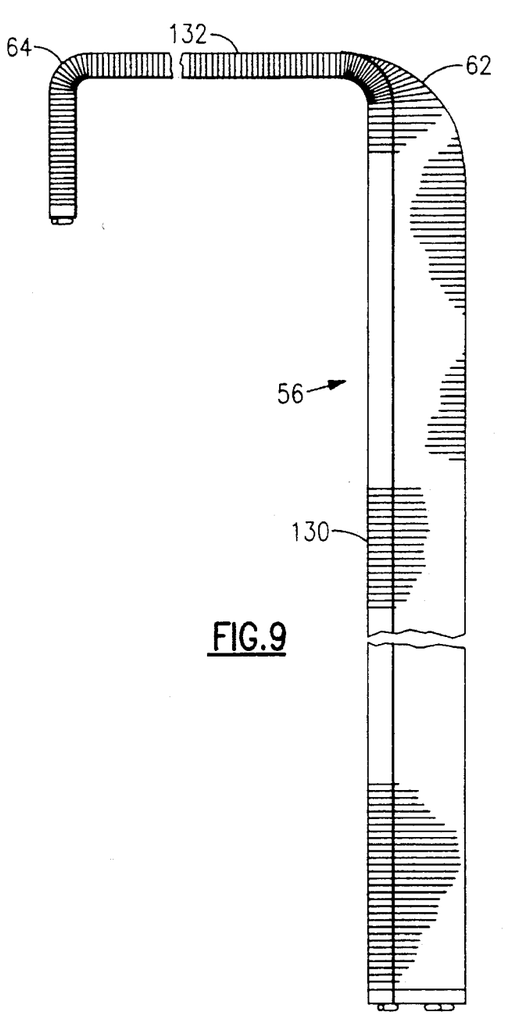
FIG. 9 is a plan view of a condenser heat exchange coil.
Figure 10:
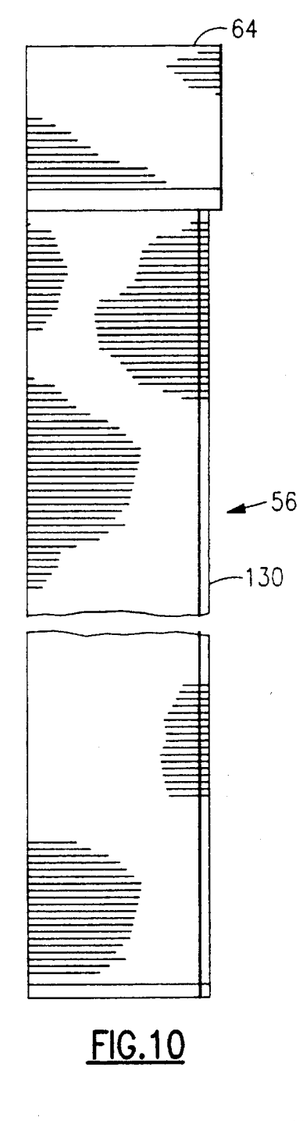
FIG. 10 is a side view of the coil of FIG. 9.
Figure 11:
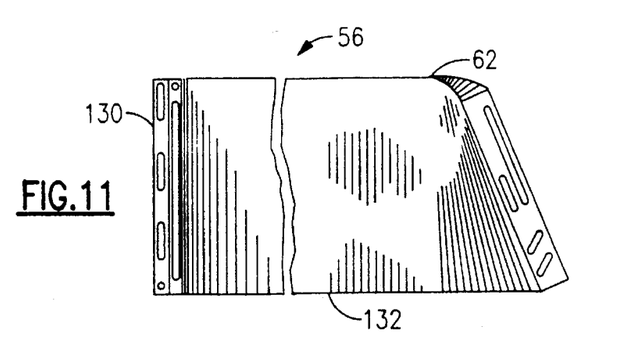
FIG. 11 is an end view of the coil of FIG. 9.

Referring in detail to the various drawing figures, and in particular FIGS. 9, 10 and 11, the details of the condenser heat exchanger coil 56 are shown. The coil 56 is of the plate fin and tube type comprising a plurality of refrigerant tubes which may comprise two or more rows extending in a serpentine fashion therethrough and having plate type heat exchange fins installed thereon. As is shown in, among other views FIGS. 4, 6, 7 and 8, the condenser coil 56 comprises a major elongated section 130 which is inclined from the vertical. As is best seen in FIGS. 4, 9 and 11, the coil makes a transition from the inclined section 130 through a double bend 62 to a vertically extending section 132. By a double bend it is meant that the heat exchange coil undergoes a bend in two different planes. Specifically, the heat exchange coil makes a 90 degree bend from the major elongated section 130 to the shorter vertical section 132 while at the same time the elongated section 130 is bent from the inclined orientation to the vertical orientation. Further, as mentioned hereinabove, the vertical section 132 then makes a further turn, as at 64, to define the U-shaped section defining the region 66 previously described.

It will be appreciated that the configuration of the condenser heat exchange coil 56 allows a combination of an aesthetically pleasing package wherein the sides of the unit are inclined and the height of the unit is minimized while at the same time allowing an increased length of condenser heat exchange coil to thereby provide optimum performance.

Looking now at FIGS. 12 through 16, the details of attachment of the evaporator air delivery assembly 42 to the partition 48 will be described. As best shown in FIG. 13 and as described hereinabove, each evaporator air delivery assembly 42 includes two blowers or fans 44 driven by an intermediately disposed electric motor 46. The blowers and motor 44, 46 are carried by an evaporator air delivery assembly mounting plate 90. The mounting plate is provided with a vertically extending notch 136 formed in the upper edge 138 thereof.

Looking now at FIG. 15, an upstanding protrusion 140 is integrally molded into the bottom 88 of the base. The upstanding protrusion 140 is spaced from the partition wall 48 a distance substantially equal to the thickness of the mounting plate 90 and defines a space 142 between the protrusion 140 and the wall 48. Attached to the partition wall 48 at a location substantially directly above the protrusion 140 is a vertically oriented U-shaped bracket 144. The bracket 144 may be formed from sheet metal and attached to the partition wall 48 permanently by conventional fastening means.

Installation of the evaporator fan delivery assembly 42 to the partition 48 is achieved by placing the lower edge 146 of the mounting plate 90 into the space 142 between the protrusion 140 and the partition wall 48 with the lower edge 46 resting on the bottom 88 of the base. The plate is then moved in to confronting sealing engagement with the partition wall 48 with the U-shaped bracket 144 extending into the notch 136. As so positioned the openings 92 and in the mounting plate 90 are in fluid flow communication with the openings 98 in the partition wall 48. Attachment of the assembly is then completed by use of a retaining clip 148 as illustrated in detail in FIG. 14. The clip 148 is formed preferably from a sheet metal stamping and comprises three spaced parallel fingers 150. These fingers extend from a U-shaped channel section 152 which structurally interconnects the three fingers and provides a handle type configuration to facilitate easy manual insertion of the clip.

As shown in FIGS. 12 and 16, the clip is adapted such that the middle finger 150 is received within the U-shaped bracket and the two other fingers 150 are adapted to engage the side of the mounting plate 90 which is not in engagement with the partition 48. The size of the U-shaped bracket and the thickness of the fingers 150 are such that the fingers are frictionally retained within the U-shaped bracket 144 and in retaining relationship with the mounting plate 90 to thereby hold the mounting plate in the desired operable engagement with the partition wall 48. Removal of an evaporator fan assembly 42 or replacement for maintenance reasons, accordingly, may be readily carried out by simply withdrawing the retaining clip 148, removing the unit 42 and replacing it with an operable assembly 42, which may in turn be easily attached in the manner described.

It will thus be appreciated that there has been disclosed a new and improved roof mounted air conditioner unit 24 suitable for mounting on the roof of a vehicle such as a bus. The unit comprises a compact efficient arrangement of the heat exchange coils, air delivery passageways, and fans and makes use of an extremely compact yet large surface area condenser coil arrangement,. The unit utilizes an evaporator fan mounting arrangement which greatly simplifies the fan mounting and reduces the labor required in replacing such a fan assembly. The air conditioner further comprises a clam shell type arrangement wherein the upper cover is fabricated from a single molded piece, and, the supporting base is also a single piece in which the coils, air handling fans and air supply passages are all molded and/or supported therein.

What is claimed is:

1. An air conditioner unit suitable for mounting on the roof of a vehicle, the vehicle having a front, back, first and second sides, a passenger compartment, air delivery ducts for delivering conditioned air to the passenger compartment, conditioned air openings in the roof in communication with said air delivery ducts, and return air openings in the roof in communication with the passenger compartment, said air conditioning unit comprising:

- a base having a bottom, top, first and second ends, first and second sides, and a longitudinal axis extending between said first and second ends said base being adapted to be attached to the roof of said vehicle, with the longitudinal axis of the base oriented front to back on said vehicle,
- a longitudinal opening in the bottom of said base extending substantially parallel to said longitudinal axis and having first and second sides respectively, which are equally spaced, from, and substantially parallel to, said first and second sides of said base;
- first and second elongated evaporator coils having first and second sides, first and second ends, and a longitudinal axis which extends between said first and second ends, said first and second evaporator coils each being mounted with the first side thereof adjacent to said first and second sides respectively of said longitudinal opening, with the longitudinal axes of said evaporator coils being parallel to the longitudinal axes of said base
- first and second evaporator air delivery means mounted on said base respectively adjacent to the second sides of said first and second evaporator coils;
- first and second elongated condenser coils having first and second ends and a longitudinal axis which extends between the first and second ends, said first and second condenser coils being mounted respectively adjacent to said first and second sides of said base, with the longitudinal axes of said condenser coils being substantially parallel to the longitudinal axis of said base; and
- first and second condenser air delivery means mounted on said base respectively, between said first condenser coil and said first evaporator air delivery means, and, between said second condenser coil and said second evaporator air delivery means.

2. The air conditioner unit of claim 1 wherein each of the first and second elongated condenser coils comprise an elongated section beginning at a first end thereof and a second shorter section extending substantially perpendicular to said first second at the second end thereof.

3. The air conditioner unit of claim 2 wherein the condenser coil comprises a third longitudinal section thereof extending from said second perpendicular section, said third section extending substantially parallel to said first section.

4. The air conditioning unit of claim 1 wherein said evaporator air delivery means comprise fans having discharge openings which are substantially vertically oriented and which discharge into an opening in a vertically extending partition which extends between said evaporator air delivery means and said condenser air delivery means.

5. The air conditioning unit of claim 4 wherein said base includes a plurality of supply air passageways therein, and, wherein each of said evaporator air delivery fans discharges into a dedicated air passageway.

6. The air conditioning unit of claim 5 wherein each of said first and second evaporator air delivery means comprises four or more fans.

* * * * *